US011226952B2

(12) United States Patent
Li et al.

(10) Patent No.: US 11,226,952 B2
(45) Date of Patent: Jan. 18, 2022

(54) METHOD, APPARATUS AND ELECTRONIC DEVICE FOR BLOCKCHAIN-BASED ASSET ISSUANCE

(71) Applicant: Advanced New Technologies Co., Ltd., Grand Cayman (KY)

(72) Inventors: Lichun Li, Hangzhou (CN); Zheng Liu, Hangzhou (CN); Shan Yin, Hangzhou (CN); Wenbin Zhang, Hangzhou (CN); Baoli Ma, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/523,312

(22) Filed: Jul. 26, 2019

(65) Prior Publication Data

US 2020/0034352 A1 Jan. 30, 2020

(30) Foreign Application Priority Data

Jul. 27, 2018 (CN) .......................... 201810847107.8

(51) Int. Cl.
*G06F 16/23* (2019.01)
*G06Q 20/38* (2012.01)
*H04L 9/32* (2006.01)

(52) U.S. Cl.
CPC ..... *G06F 16/2336* (2019.01); *G06Q 20/3829* (2013.01); *H04L 9/3242* (2013.01); *H04L 2209/56* (2013.01)

(58) Field of Classification Search
CPC ...... C08L 55/02; C08L 77/00; C08L 2666/18; G06F 16/2336; G06Q 20/3829; H04L 9/3242; H04L 2209/56

(Continued)

(56) References Cited

U.S. PATENT DOCUMENTS

2016/0342977 A1* 11/2016 Lam ..................... G06Q 20/02
2018/0315026 A1* 11/2018 Kraemer .............. G06Q 20/065

FOREIGN PATENT DOCUMENTS

CN 104717067 6/2015
CN 104850984 8/2015
(Continued)

OTHER PUBLICATIONS

E. T. Taniguchi and H. Yamamoto, "Deniable ring authenticated private key establishment," 2008 International Symposium on Information Theory and Its Applications, 2008, pp. 1-6, doi: 10.1109/ISITA.2008.4895467. (Year: 2008).*

(Continued)

*Primary Examiner* — Alexander G Kalinowski
*Assistant Examiner* — John O Preston
(74) *Attorney, Agent, or Firm* — Fish & Richardson P.C.

(57) ABSTRACT

A node device in a blockchain receives an asset issuance transaction from an asset issuer, where the asset issuance transaction comprises a commitment value and a proof for performing a zero-knowledge proof with respect to the commitment value, and where the commitment value is calculated by inputting at least an asset type of a target asset object issued by the asset issuer to a commitment function. The zero-knowledge proof with respect to the commitment value based on the proof is initiated. It is determined that the asset type of the target asset object is in a set of legal asset types allowed to be issued by the asset issuer. In response to determining that the asset type of the target asset object is in the set of legal asset types allowed to be issued by the asset issuer, the commitment value to the blockchain is issued for storage.

19 Claims, 3 Drawing Sheets

(58) Field of Classification Search
USPC .................................................... 705/36 R
See application file for complete search history.

(56) References Cited

FOREIGN PATENT DOCUMENTS

| | | |
|---|---|---|
| CN | 107274184 | 10/2017 |
| CN | 107438002 | 12/2017 |
| CN | 107666388 | 2/2018 |
| CN | 107833135 | 3/2018 |
| CN | 107862216 | 3/2018 |
| CN | 108090751 | 5/2018 |
| CN | 108171511 | 6/2018 |
| KR | 101837169 | 3/2018 |

OTHER PUBLICATIONS

Efficient Transformation of Well Known Signature Schemes into Designated Confirmer Signature schemes. Shafi Goldwasser, Erez Waisbard. Department of Computer Science and Applied Mathematics. (Year: 2003).*

A. Broadbent, Z. Ji, F. Song and J. Watrous, "Zero-Knowledge Proof Systems for QMA," 2016 IEEE 57th Annual Symposium on Foundations of Computer Science (FOCS), 2016, pp. 31-40, doi: 10.1109/FOCS.2016.13. (Year: 2016).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Appln No. PCT/US2019/043438, dated May 27, 2020, 13 pages.

Poelstra et al, "Blockstream Releases Confidential Assets," retrieved on May 12, 2020, retrieved from: <https://blockstream.com/2017/04/03/en-blockstream-releases-elements-confidential-assets/#>, Apr. 3, 2017, 9 pages.

Poelstra et al, "Confidential Assets," retrieved on Jul. 2, 2020, retrieved from: URL<https://web.archive.org/web/20180513061032/https://blockstream.com/bitcoin17-final41.pdf, XPo55631134, May 13, 2019, 21 pages.

* cited by examiner

```
┌─────────────────────────────────────────────────────────────────┐
│ receiving an asset issuance transaction sent by an asset issuer,│
│ wherein the asset issuance transaction comprises a commitment   │
│ value and a proof for performing Zero-knowledge Proof with      │── 102
│ respect to the commitment value, and wherein the commitment     │
│ value is calculated by inputting at least an asset type of a    │
│ target asset object issued by the asset issuer as input data    │
│ to a commitment function                                        │
└─────────────────────────────────────────────────────────────────┘
                                │
                                ▼
┌─────────────────────────────────────────────────────────────────┐
│ initiating the Zero-knowledge Proof with respect to the         │
│ commitment value based on the proof, so to verify whether the   │── 104
│ asset type of the target asset object is a legal asset type     │
│ allowed to be issued by the asset issuer                        │
└─────────────────────────────────────────────────────────────────┘
                                │
                                ▼
┌─────────────────────────────────────────────────────────────────┐
│ if the verification result is YES, issuing the commitment value │── 106
│ to the blockchain for storage                                   │
└─────────────────────────────────────────────────────────────────┘
```

FIG. 1

METHOD, APPARATUS AND ELECTRONIC DEVICE FOR BLOCKCHAIN-BASED ASSET ISSUANCE

CROSS-REFERENCE TO RELATED APPLICATIONS

This application claims priority to Chinese Patent Application No. 201810847107.8, filed on Jul. 27, 2018, the entire contents of which are incorporated herein by reference.

TECHNICAL FIELD

One or more embodiments of the present disclosure relate to the field of blockchain technologies, and in particular, relate to a method, an apparatus and an electronic device for blockchain-based asset issuance.

BACKGROUND

Blockchain technology, also known as distributed ledger technology, is an emerging technology in which several computing devices jointly participate in "accounting" and jointly maintain a complete distributed database. The blockchain technology has been widely used in many fields because of its properties of decentralization, open and transparent, each computing device participating in database records, and quickly synchronizing data among the computing devices.

SUMMARY

According to the present specification, a method for blockchain-based asset issuance is provided. The method may be applied to a node device in the blockchain and may include: receiving an asset issuance transaction sent by an asset issuer, where the asset issuance transaction includes a commitment value and a proof for performing Zero-knowledge Proof with respect to the commitment value, and the commitment value is calculated by inputting at least an asset type of a target asset object issued by the asset issuer as input data to a commitment function; initiating the Zero-knowledge Proof with respect to the commitment value based on the proof, so to verify whether the asset type of the target asset object is a legal asset type allowed to be issued by the asset issuer; and if the verification result is YES, issuing the commitment value to the blockchain for storage.

According to the present disclosure, an apparatus for blockchain-based asset issuance is also provided. The apparatus may be applied to a node device in the blockchain and may include: a receiver, configured to receive an asset issuance transaction sent by an asset issuer, where the asset issuance transaction includes a commitment value and a proof for performing Zero-knowledge Proof with respect to the commitment value, and the commitment value is calculated by inputting at least an asset type of a target asset object issued by the asset issuer as input data to a commitment function; a verification module, configured to initiate the Zero-knowledge Proof with respect to the commitment value based on the proof, so to verify whether the asset type of the target asset object is a legal asset type allowed to be issued by the asset issuer; a storing module, configured to issue the commitment value to the blockchain for storage if the verification result is YES.

According to the present disclosure, an electronic device is further provided. The electronic device includes a processor and a memory for storing machine-executable instructions. By reading and executing the machine-executable instructions corresponding to control logic of the blockchain-based asset issuance stored by the memory, the processor is caused to: receiving an asset issuance transaction sent by an asset issuer, where the asset issuance transaction includes a commitment value and a proof for performing Zero-knowledge Proof with respect to the commitment value, and the commitment value is calculated by inputting at least an asset type of a target asset object issued by the asset issuer as input data to the commitment function; initiating the Zero-knowledge Proof with respect to the commitment value based on the proof, so to verify whether the asset type of the target asset object is a legal asset type allowed to be issued by the asset issuer; and if the verification result is YES, issuing the commitment value to the blockchain for storage.

According to the above embodiments, on the one hand, since the asset issuance transaction only carries a commitment value which is calculated by inputting at least an asset type of an issued target asset object as input data to a commitment function, without carrying the asset type of the target asset object in plaintext form, the blockchain may hide the asset type of the target asset object issued by the asset issuer, thereby effectively protecting the privacy of the asset issuer.

On the other hand, since the asset issuance transaction also carries a proof for performing the Zero-knowledge Proof with respect to the commitment value, though the asset type issued by the asset issuer is hidden, the node device in the blockchain may perform the Zero-knowledge Proof with the proof, so to verify whether the asset type of the target asset object issued by the asset issuer is a legal asset type allowed to be issued by this asset issuer.

BRIEF DESCRIPTION OF DRAWINGS

FIG. 1 is a flowchart of a method for blockchain-based asset issuance according to an exemplary embodiment.

DESCRIPTION OF IMPLEMENTATION

Figure 2:
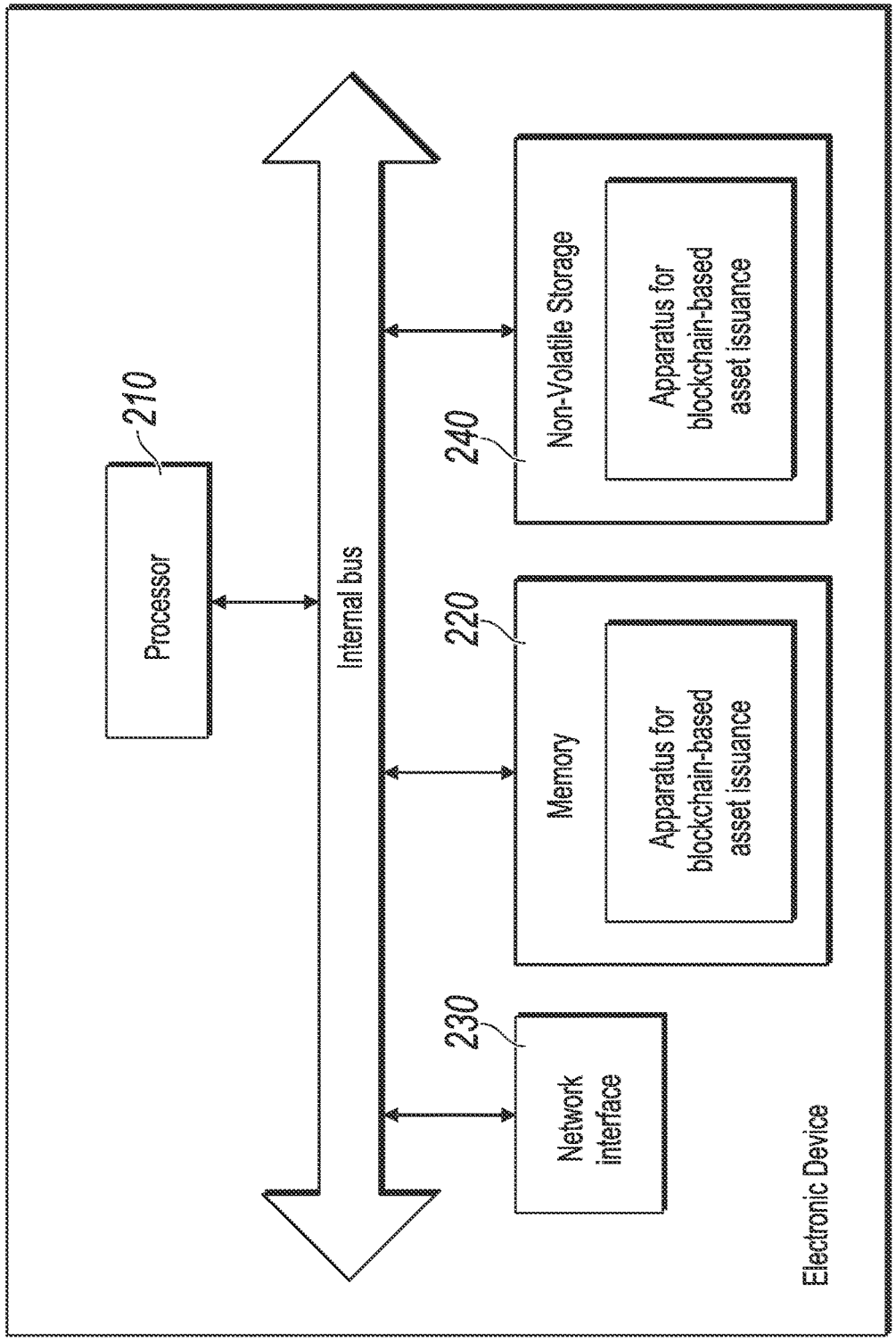
FIG. 2 is a structural diagram of an electronic device according to an exemplary embodiment.

Zero-knowledge Proof is a cryptography technique. Using this technique, a prover can convince one or more verifiers to believe that a certain assertion is correct without providing any sensitive information to the one or more verifiers.

This disclosure is intended to disclose such a technical solution: by organically combining a zero-knowledge proof algorithm with an asset issuance mechanism of blockchain, even if an asset type issued by an asset issuer is hidden, a node device in the blockchain can normally verify whether the asset type issued by the asset issuer is a legal asset type allowed to be issued by the asset issuer.

In an implementation, when an asset issuer is to issue a created asset object to a blockchain, the asset issuer may calculate a commitment value, by inputting the asset type of the target asset object desired to be issued this time, as input data (the input data may also contain other information to be hidden, such as a public key of asset recipient) to a commitment function; and generate a proof for performing Zero-knowledge Proof with respect to the commitment value based on a zero-knowledge proof algorithm implemented in the blockchain. Then, the asset issuer may construct an asset issuance transaction based on the above commitment value and the above proof and issue the above target asset object by transmitting the asset issuance transaction to the blockchain.

When a node device in the blockchain receives the asset issuance transaction, the node device may obtain the above commitment value and the above proof carried in the above asset issuance transaction, and then initiate the Zero-knowledge Proof for the above commitment value based on the proof with the zero-knowledge proof algorithm, so to verify whether the asset type of the target asset object is a legal asset type allowed to be issued by the asset issuer.

If it is verified that the asset type of the target asset object is a legal asset type allowed to be issued by the asset issuer, the commitment value may be issued to the blockchain for storage, so to accomplish an issuance process of the target asset object.

In the above technical solution, on the one hand, since the asset issuance transaction does not carry the asset type of the target asset object issued by the asset issuer in a plaintext form, but only carries the commitment value which is calculated by inputting at least the asset type of the target asset object as input data into the commitment function, the blockchain may hide the asset type of the target asset object issued by the asset issuer, thereby effectively protecting the privacy of the asset issuer.

On the other hand, since the asset issuance transaction also carries the proof for performing the Zero-knowledge Proof with respect to the commitment value, even if the asset type issued by the asset issuer is hidden, a node device in the blockchain may perform the Zero-knowledge Proof based on the proof, so to verify whether the asset type of the target asset object issued by the asset issuer is a legal asset type allowed to be issued by this asset issuer or not.

The present disclosure is described below through specific embodiments and specific application scenarios.

Referring to FIG. 1, FIG. 1 is a flowchart of a method for blockchain-based asset issuance according to an embodiment of the present disclosure. The method for blockchain-based asset issuance may be applied to a node device in a blockchain and may include the following steps.

At step 102, an asset issuance transaction sent by an asset issuer is received. The asset issuance transaction includes a commitment value and a proof for performing Zero-knowledge Proof with respect to the commitment value, and the commitment value is calculated by inputting at least an asset type of a target asset object issued by the asset issuer as input data to a commitment function.

At step 104, the Zero-knowledge Proof with respect to the commitment value is initiated based on the proof, so to verify whether the asset type of the target asset object is a legal asset type allowed to be issued by the asset issuer.

At step 106, if the verification result is YES, the commitment value is issued to the blockchain for storage.

The blockchain described in the disclosure may specifically be any type of blockchain network in which the supported objects include an asset object.

For example, in a traditional blockchain, the supported objects typically only include an account object and a contract object. In this disclosure, the objects supported by the blockchain are extended. On the basis of existing objects supported by the blockchain, such as the account object and the contract object, the objects supported by the blockchain are extended to further include an asset object.

It should be noted that, the type of blockchain described in this disclosure is not limited to any specific type and may be a consortium blockchain, or any type of blockchain other than the consortium blockchain, such as a private blockchain, a public blockchain, and the like.

The contract object may specifically include an intelligent contract procedure for managing the asset object supported by the blockchain. The intelligent contract procedure is issued to the blockchain by a target member of the blockchain, and recorded in a distributed database (i.e., a blockchain ledger) of the blockchain. A user accessing to the blockchain may create an asset object in the blockchain by invoking the contract object, and perform online management to a held asset object in the blockchain.

In an example, the blockchain may be a consortium blockchain composed of a number of financial institutions as consortium members. In this case, the target member in the blockchain may be a financial institution as a consortium member which has permission to create an asset object in the consortium blockchain. Through this consortium blockchain, a distributed intelligent contract platform may be built, and an operator of the intelligent contract platform may expand the types of objects supported by the intelligent contract platform. For example, on the basis of existing supported objects, such as the account object and the contract object, the supported objects may be extended to further include an asset object, so that a financial institution as the consortium member may create a new asset type in the platform by issuing an intelligent contract (i.e., the contract object) to the blockchain, and a user accessing to the blockchain may create an asset object by invoking the intelligent contract and perform online management for a held asset object.

The asset object may include an intelligent asset object. The intelligent asset object is used to maintain the intelligent asset which corresponds to any type of real asset in the real world, and enable the intelligent asset to be suitable for being processed in the blockchain. For example, the intelligent asset object is especially suitable for being processed by the intelligent contract and the like in the blockchain. The intelligent asset may correspond to any types of real asset in the real world, and this is not particularly limited in this disclosure.

For example, the above blockchain is a consortium blockchain composed of a number of financial institutions. In practical applications, any type of offline assets of user, such as funds, real estate, stocks, loan contracts, bills, accounts receivable, etc., may be packed into digital assets by a financial institution which manages node devices in the consortium blockchain, and created and issued to a distributed database of the consortium blockchain.

The transaction described in this disclosure refers to a piece of data which is created by a user through a client terminal of the blockchain and to be finally issued to the distributed database of the blockchain.

For the transaction in the blockchain, there is difference between narrowly defined transaction and broadly defined transaction. The narrowly defined transaction refers to a value transfer which is issued to the blockchain by a user. For example, in a traditional bitcoin blockchain network, the transaction may be a money transfer initiated by a user in the blockchain. The broadly defined transaction refers to a piece of business data with business intent which is issued to the blockchain by a user. For example, an operator may build a consortium blockchain based on actual business requirements, and based on the consortium blockchain, deploy some online services that are not related to value transfer, such as virtual asset business, rental business, vehicle dispatching business, insurance claims business, credit service, medical care, etc. In this type of consortium blockchain, the transaction may be a business message or a business request with business intent which is issued into the consortium blockchain by a user.

It should be noted that, a consensus algorithm implemented in the blockchain is not particularly limited in the present disclosure. In practical applications, a *Byzantine* Fault Tolerance algorithm may be taken as the consensus algorithm, or a non-*Byzantine* Fault Tolerance algorithm may be taken as the consensus algorithm.

The so-called *Byzantine* Fault Tolerant algorithm refers to, in a distributed network composed of several node devices, a distributed fault-tolerant algorithm in which a *Byzantine* node (i.e., a corrupt node) is to be considered, such as Practical *Byzantine* Fault Tolerance (PBFT) algorithm. If the *Byzantine* Fault Tolerant algorithm is used in the blockchain network for a consensus process, it is considered that there are both corrupt nodes and fault nodes in the blockchain. Accordingly, the so-called non-*Byzantine* Fault Tolerant algorithm refers to, in a distributed network composed of several node devices, a distributed fault-tolerant algorithm in which the *Byzantine* node is not considered, such as raft algorithm. If the non-*Byzantine* Fault Tolerant algorithm is used in the blockchain network for a consensus process, it is considered that there is no corrupt node, but only faulty nodes in the blockchain.

In an illustrated embodiment, the blockchain may be a consortium blockchain composed of a number of trusted financial institutions as consortium members. A financial institution with permission to issue an asset object in the consortium blockchain may create a newly added asset type by issuing an intelligent contract (i.e., the contract object) into the consortium blockchain, and publicly issue the newly added asset type into the consortium blockchain.

The specific process for a financial institution issuing an intelligent contract into the consortium blockchain is not described in details in the present disclosure. Those skilled in the art may refer to the description in the related art.

For example, in an actual application, a financial institution may issue a created intelligent contract into the consortium blockchain by issuing a transaction into the consortium blockchain based on a held private key. For each of the consortium members in the consortium blockchain, when receiving a transaction issued from other financial institution through a managed node device, the consortium member may, based on the consensus algorithm for the consortium blockchain, perform a consensus process on transactions issued into the consortium blockchain in a recent period of time, and record the intelligent contract issued by the transaction to the distributed database of the consortium blockchain after the consensus process is completed.

In an intelligent contract corresponding to the newly added asset type which is issued into the consortium blockchain by a financial institution, an executable program for creating an asset object may be declared in advance. The financial institution as the asset issuer may, by invoking the executable program declared in the intelligent contract, create online one or more target asset objects to be issued, and then locally store original information of the created target asset object.

For example, in an actual application, the asset issuer may locally store the original information (such as the asset type, the asset quantity, etc.) of the created target asset object in the form of a credential.

After completing the creation of the target asset object, the asset issuer may further construct an asset issuance transaction based on the locally stored original information of the target asset object, and then issue the target asset object by transmitting the asset issuance transaction to the blockchain.

It should be noted that, in practical applications, in some digital asset systems built based on blockchain, only some trusted asset issuers are allowed to issue one or more specific types of asset objects.

For example, in a blockchain-based foreign exchange system, digital assets that may be issued to the blockchain may include a plurality of types of foreign exchange assets, while some reputable financial institutions as asset issuers may only be allowed to issue one or more specific foreign exchange assets to the blockchain for providing liquidity. For example, Hong Kong branch of a certain bank as an asset issuer may only be allowed to issue Hong Kong's onshore Hong Kong dollar assets and Hong Kong's onshore United State dollar assets in the foreign exchange system.

Moreover, for the purpose of privacy protection, it may be necessary to hide the asset type of the issued target asset object and other type of private data related to the target asset object.

For example, in addition to the necessity of hiding the asset type of the issued target asset object, it may be also necessary to hide the asset quantity of the issued target asset object and the identity information of the asset issuer.

Based on this, in the present disclosure, when an asset issuer issues a created target asset object to the blockchain, private data such as the asset type of the target asset object may be no longer directly carried in an asset issuance transaction constructed accordingly. As a prover of Zero-knowledge Proof, the asset issuer may issue the target asset object by: calculating a commitment value by inputting at least the asset type of the target asset object to be issued as input data to a commitment function; generating a proof for performing the Zero-knowledge Proof with respect to the commitment value by using zero-knowledge proof algorithm implemented in the blockchain; and transmitting the asset issuance transaction to the blockchain with carrying the commitment value and the proof in the constructed asset issuance transaction.

1) Generation of the Commitment Value

The above commitment function is a one-way function that is often used in the field of cryptography, security, and privacy protection, and for commitment to original data without revealing the original data. An output value of the commitment function is called as a commitment value. Based on the characteristics of the one-way function, after a commitment value is calculated by inputting original data into the commitment function, it is impossible to restore the original data from the commitment value by a reverse calculation. At the same time, it is impossible to find two different original data for which respective commitment values are equal.

For example, in an embodiment shown in the present disclosure, the commitment function usually is a hash function. In this case, the commitment value may be a hash value calculated by inputting at least the asset type of the target asset object to be issued as input data to the hash function.

It should be noted that, in the present disclosure, specific content of the input data used for calculating the commitment value based on the commitment function depends on the content to be hidden when issuing the target asset object.

In practical applications, in addition to the asset type of the target asset object to be hidden, the input data to the commitment function may also include an asset quantity of the target asset object, and a public key of receiver for the target asset object (the receiver may be an asset issuer, or a third party), and even include a generated random number and the like, which are not enumerated in this disclosure.

2) Generation of the Proof

In the present disclosure, the algorithm type of the zero-knowledge proof algorithm implemented in the blockchain is not particularly limited.

For example, in an embodiment according to the present disclosure, the blockchain may implement (or carry) a general zero-knowledge proof algorithm such as zksnark (zero-knowledge succint non-interactive argument of knowledge) algorithm, or zkstark (zero-knowledge scalable transparent argument of knowledge) algorithm. In implementation, executable codes associated with the algorithmic logic of the zero-knowledge proof algorithm such as the zksnark algorithm and the zkstark algorithm may be embedded in an intelligent contract and issued to the blockchain. The executable codes embedded in the intelligent contract may be executed by invoking the intelligent contract, so to accomplish processes of the Zero-knowledge Proof such as generating the proof and verifying the proof.

The zero-knowledge proof algorithm implemented in the blockchain generally includes a key generation algorithm, a proof generation algorithm, and a proof verification algorithm. The key generation algorithm is responsible for calculating a proving key (which may be used as input data for generating the proof) and a verification key (which may be used as input data for verifying the proof). The proof generation algorithm is responsible for generating the proof. The proof verification algorithm is responsible for verifying the proof and obtaining a verification result of either true or false.

Taking the zksnark algorithm as an example, the zksnark algorithm consists of three algorithms: G, P, and V. The G algorithm represents a key generator, which is responsible for generating a proving key and a verification key. The P algorithm is responsible for generating the proof. The V algorithm is responsible for verifying the proof generated with the P algorithm, and obtaining a verification result of either true or false.

It should be noted that, when the proof is to be calculated by an asset issuer based on the proof generation algorithm implemented in the blockchain, specific content of input data to the proof generation algorithm generally depends on the judgment to be conducted the Zero-knowledge Proof.

According to this disclosure, the judgment to be conducted the Zero-knowledge Proof may specifically include, whether an asset type of a target asset object issued by an asset issuer is a legal asset type allowed to be issued by the asset issuer.

Of course, the judgment to be conducted the Zero-knowledge Proof usually depends on specific requirements of user. In practical applications, the judgment to be conducted the Zero-knowledge Proof may also include other judgments than the judgment described above, which are not enumerated in this disclosure.

(1) A First Method for Generating the Proof

In an embodiment of the present disclosure, for the above judgment "whether an asset type of a target asset object issued by an asset issuer is a legal asset type allowed to be issued by the asset issuer" to be conducted the Zero-knowledge Proof, specific content of the input data for generating the proof based on the proof generation algorithm by the asset issuer includes at least the commitment value calculated with the commitment function and legal asset type(s) allowed to be issued by the asset issuer.

That is, for the asset issuer, it is necessary to input at least the commitment value and the legal asset type(s) allowed to be issued by the asset issuer as the input data to the proof generation algorithm for calculating, so to generate the proof for performing the Zero-knowledge Proof with respect to the commitment value.

(2) A Second Method for Generating the Proof

In an embodiment of the present disclosure, the node device may also locally maintain a verification rule for verifying whether the asset type of the target asset object issued by the asset issuer is a legal asset type allowed to be issued by the asset issuer.

In this case, based on the above judgment to be conducted the Zero-knowledge Proof, specific content of the input data for generating proof based on the proof generation algorithm further includes verification data related to the verification rule.

That is, for the asset issuer, it is necessary to input at least the verification data related to the verification rule to the proof generation algorithm for calculating, so to generate the proof for performing the Zero-knowledge Proof with respect to the commitment value.

It should be noted that, in practical applications, when the target asset object is to be issued to the blockchain by the asset issuer, in the transaction related to the target asset object, in addition to that the asset type of the issued target asset object can be hidden, the identity information of the asset issuer may also be selectively hidden in the blockchain.

In an illustrated embodiment, if the blockchain does not support hiding the identity information of the asset issuer, the identity information of the asset issuer issuing the target asset object is fully disclosed.

When receiving the asset issuance transaction sent by the asset issuer, a node device in the blockchain only needs to verify whether the asset type of the target asset object is a legal asset type allowed to be issued by the asset issuer through the Zero-knowledge Proof, but does not need to conduct the zero-knowledge proof on the identity information of the asset issuer at the same time. That is, the node device does not need to verify whether the asset issuer is one of legal asset issuers.

In this case, it is not necessary to additionally incorporate a private key of the asset issuer into the input data for generating the proof.

In an illustrated embodiment, if the blockchain supports hiding the identity information of the asset issuer, the identity information of the asset issuer issuing the target asset object is not fully disclosed.

When receiving the asset issuance transaction sent by the asset issuer, in addition to verifying whether the asset type of the target asset object is a legal asset type allowed to be issued by the asset issuer through the Zero-knowledge Proof, a node device in the blockchain further needs to verify whether the asset issuer holds a private key corresponding to a public key of legal asset issuer.

That is, in addition to verifying whether the asset type of the asset object issued by the asset issuer is a legal asset type allowed to be issued by the asset issuer, the zero-knowledge proof needs to further verify whether the asset issuer is one of legal asset issuers.

In this case, it is necessary to additionally incorporate the private key of the asset issuer into the input data for generating the proof.

3) Zero-Knowledge Verification with Respect to the Commitment Value

When receiving the above asset issuance transaction sent by an asset issuer, a node device in the blockchain (such as the node device participating in the consensus process) may obtain information such as the proof and the commitment value carried in the asset issuance transaction, and initiate the Zero-knowledge Proof with respect to the commitment value based on the proof, so to verify whether the asset type of the target asset object is a legal asset type allowed to be issued by the asset issuer.

Specifically, as a verifier of the Zero-knowledge Proof, the node device may calculate with a proof verification algorithm by inputting at least the proof and the commitment value as input data into the proof verification algorithm, and then determine whether the asset type of the target asset object is a legal asset type allowed to be issued by the asset issuer based on an output result from the proof verification algorithm.

Taking the zksnark algorithm as an example, when a zero-knowledge verification is to be performed on the proof, the proof and the commitment value may be input as input data into the V algorithm of the zksnark algorithm for calculation. If an output result from the V algorithm is true, the judgment to be conducted the Zero-knowledge Proof indicates true, that is, the asset type of the target asset object is a legal asset type allowed to be issued by the asset issuer. On the contrary, if the output result from the V algorithm indicates false, the judgment to be conducted the Zero-knowledge Proof is false, that is, the asset type of the target asset object is an illegal asset type that is not allowed to be issued by the asset issuer.

It should be noted that, in the present disclosure, the node device in the blockchain, as a verifier of the Zero-knowledge Proof, may configure locally a verification rule for performing the Zero-knowledge Proof with respect to the judgment.

In the following, specific processes of performing the Zero-knowledge Proof with respect to the judgment in cases that the proof is generated according to the first and second methods for generating the proof are respectively described in details.

According to the present disclosure, if the proof is generated according to the first method for generating the proof, when a node device as the verifier of the Zero-knowledge Proof conducts the Zero-knowledge Proof on the commitment value with the proof verification algorithm, in addition to the commitment value and the proof, specific content of the input data further includes verification data as assisted data for performing the Zero-knowledge Proof. The verification data is related to the verification rule configured locally by the node device for conducting the Zero-knowledge Proof on the judgment.

Of course, in some scenarios, if taking the commitment value and the proof as the input data is enough to accomplish the Zero-knowledge Proof on the judgment, in the input data for performing the Zero-knowledge Proof with respect to the commitment value based on the above proof verification algorithm, the verification data related to the above verification rule may be null.

It should be noted that, specific content of the verification rule described above for performing the Zero-knowledge Proof on the above judgment is not particularly limited in the present disclosure, and will be described below in conjunction with a specific scenario.

For the first method for generating the proof, a node device as a verifier of the Zero-knowledge Proof may perform the Zero-knowledge Proof to verify whether the asset type of the target asset object matches a legal asset type allowed to be issued by the asset issuer or not, so to determine whether the asset type of the target asset object is the legal asset type allowed to be issued by the asset issuer or not.

In an illustrated embodiment, a node device as a verifier of the Zero-knowledge Proof may construct an asset type list based on legal asset types which are allowed to be issued by the asset issuer and maintain the asset type list locally.

Accordingly, the above verification rule may include: verifying whether the asset type of the target asset object is included in the above asset type list or not; and if the verification result is YES, determining that the asset type of the target asset object is a legal asset type allowed to be issued by the asset issuer.

In this scenario, the verification data related to the verification rule may be the above asset type list. That is, the node device may accomplish the Zero-knowledge Proof with respect to the commitment value by calculating with the proof verification algorithm with inputting the commitment value, the proof, and the asset type list as input data.

In another illustrated embodiment, a node device as a verifier of the Zero-knowledge Proof may construct a hash tree based on hash values of legal asset types that are allowed to be issued by the asset issuer, and maintains the hash tree locally.

Accordingly, the verification rule may include: verifying whether a hash value of the asset type of the target asset object is included in the hash tree, if the verification result is YES, determining that the asset type of the target asset object is the legal asset type allowed to be issued by the asset issuer.

In this scenario, the verification data related to the above verification rule may be the above hash tree. That is, the node device may accomplish the Zero-knowledge Proof with respect to the commitment value by calculating via the proof verification algorithm with inputting the commitment value, the proof, and the hash tree as input data.

It should be noted that, in cases that the blockchain either supports or not hiding the identity information of the asset issuer, the asset type list and the hash tree which are maintained locally by the node device as the verifier of the Zero-knowledge Proof have some differences in term of the content format.

On the one hand, if the blockchain supports hiding the identity information of the asset issuer, the legal asset type allowed to be issued by the asset issuer may be expressed in the form of a pair of <a public key of asset issuer, a list of legal asset types>.

In this case, the node device may generate the above asset type list based on pairs of <a public key of asset issuer, a list of legal asset types> issued by all of legal asset issuers. Moreover, the node device may create the above hash tree based on respective hash values of the pairs of <a public key of asset issuer, a list of legal asset types> issued by all of the legal asset issuers.

Accordingly, in this case, the judgement "whether the asset type of the target asset object is the legal asset type allowed to be issued by the asset issuer" to be conducted the Zero-knowledge Proof by the node device may be expressed specifically as follows: the asset issuer holds a private key corresponding to the public key of legal asset issuer, the asset type of the target asset object is included in the pair of <a public key of asset issuer, a list of legal asset types> corresponding to the public key of the asset issuer, and the pair of <a public key of asset issuer, a list of legal asset types> corresponding to the public key of the asset issuer is included in the above hash tree.

That is, in this case, when conducting the Zero-knowledge Proof on the judgement "whether the asset type of the target asset object is the legal asset type allowed to be issued by the asset issuer", the node device may be necessary to verify the following respectively: the asset issuer holds a private key corresponding to the public key of legal asset issuer, the asset type of the target asset object is included in the pair of <a public key of asset issuer, a list of legal asset types> corresponding to the public key of the asset issuer, and the pair of <a public key of asset issuer, a list of legal asset types> corresponding to the public key of the asset issuer is included in the above hash tree.

Additionally, it should be noted that, in this case, since the hash tree is constructed based on respective hash values of the pairs of <a public key of asset issuer, a list of legal asset types> of all of the legal asset issuers, when calculating the proof with the proof generation algorithm, the input data of the proof generation algorithm may include a path in the hash tree which directs to a hash value of the list of legal asset types allowed to be issued by the asset issuer, and can exclude the list of legal asset types allowed to be issued by the asset issuer.

In this way, compared with directly inputting the list of legal asset types or the hash tree constructed based on respective hash values of legal asset types allowed to be issued by the asset issuer as input data to the proof generation algorithm, data volume of the input data may be reduced, thereby improving calculation efficiency.

On the other hand, if the blockchain does not support hiding the identity information of the asset issuer, the node device may directly generate the asset type list based on legal asset types allowed to be issued by the asset issuer; or, the node device may create the hash tree based on respective hash values of the legal asset types allowed to be issued by the asset issuer.

In this case, the judgment "whether the asset type of the target asset object is the legal asset type allowed to be issued by the asset issuer" to be conducted the Zero-knowledge Proof by the node device may be expressed, without any special representation, as: by performing the Zero-knowledge Proof, verifying whether the asset type of the target asset object is included in the asset type list, or verifying whether the hash value of the asset type of the target asset object is included in the hash tree. The details will not be repeated here.

In the present disclosure, if the proof is generated by a node device according to the second method for generating the proof, when a node device as the verifier of the Zero-knowledge Proof conducts the Zero-knowledge Proof on the commitment value with the proof verification algorithm, specific content of the input data may include the verification data related to the above verification rule.

The verification rules, used in the first and second methods for generating the proof, have some differences in term of specific content.

For the second method for generating the proof, when a node device as a verifier of the Zero-knowledge Proof determines whether the asset type of the target asset object is a legal asset type allowed to be issued by the asset issuer, in addition to verifying whether the asset type of the target asset object matches the legal asset type allowed to be issued by the asset issuer or not, the node device may also verify whether a relationship between the asset type of the target asset object and the public key of the target asset issuer meets a specific matching rule or not.

For example, for each of the asset issuers, an ID of an asset type allowed to be issued by the asset issuer may be provided with a prefix or suffix which is the same as any one of follows: a public key of legal asset issuer, a prefix or suffix for a public key of legal asset issuer, a hash value of the public key of legal asset issuer, and a prefix or suffix for the hash value of the public key of legal asset issuer. Thus, once it is verified that the prefix or suffix for the asset type of the target asset object perfectly matches any one of follows: the public key of legal asset issuer, the prefix or suffix for the public key of legal asset issuer, the hash value of the public key of legal asset issuer, and the prefix or suffix for the hash value of the public key of legal asset issuer, it may be determined that the target asset object is a legal asset type that is allowed to be issued by the asset issuer.

In an illustrated embodiment, a node device as a verifier of the Zero-knowledge Proof may construct a public key list based on the public keys of all legal asset issuers and maintain the public key list locally.

Accordingly, the verification rule may include: verifying whether the prefix (or suffix) for the asset type of the target asset object matches any one of follows: the public key of legal asset issuers, the prefix (or suffix) for the public key of legal asset issuer, the hash value of the public key of legal asset issuer, and the prefix (or suffix) for the hash value of the public key of legal asset issuer; if the verification result is YES, determining that the asset type of the target asset object is the legal asset type allowed to be issued by the asset issuer.

In this scenario, the verification data related to the verification rule may be the above public key list or the hash tree. That is, the node device may accomplish the Zero-knowledge Proof with respect to the commitment value by calculating via the proof verification algorithm with inputting the public key list or the hash tree as input data.

It should be added that, if the blockchain does not support hiding the identity information of the asset issuer, since the identity information of the asset issuer is fully disclosed, the node device only needs to verify whether the asset type of the target asset object is a legal asset type allowed to be issued by the asset issuer through the Zero-knowledge Proof, but does not need to verify whether the asset issuer holds a private key corresponding to the public key of legal asset issuer.

Therefore, in this case, the algorithm logic of the above verification rule may be implanted into the zero-knowledge proof algorithm, so that the disclosed identity information of the asset issuer is enough to accomplish the Zero-knowledge Proof on the above judgment. Correspondingly, in the input data used by the node device for performing the Zero-knowledge Proof with respect to the commitment value, the verification data related to the verification rule may be null.

4) Issuance of the Commitment Value for Storage.

In the present disclosure, when a node device determines, through the Zero-knowledge Proof, that the asset type of the target asset object is the legal asset type allowed to be issued by the asset issuer, the node device may issue the commitment value to the blockchain for storage. For example, the node device may record the commitment value into a distributed database of the blockchain.

Of course, if the node device determines that the asset type of the target asset object is not a legal asset type allowed to be issued by the asset issuer through the zero-knowledge proof, the node device may directly discard the asset issuance transaction, and return a prompt message indicating issuance failure to the asset issuer. For example, the prompt message may be a text prompt that says "You don't have permission to issue this type of asset".

In the above technical solutions, on the one hand, since the asset issuance transaction only carries the commitment value which is calculated by inputting at least the asset type of the target asset object as input data into the commitment function, without carrying the asset type of the target asset object in a plaintext form, the blockchain may hide the asset type of the target asset object issued by the asset issuer, thereby effectively protecting the privacy of the asset issuer.

On the other hand, since the asset issuance transaction also carries the proof for performing the Zero-knowledge Proof with respect to the commitment value, even the asset type issued by the asset issuer is hidden, a node device in the blockchain may perform the Zero-knowledge Proof based on the proof, so to verify whether the asset type of the target asset object issued by the asset issuer is a legal asset type allowed to be issued by the asset issuer.

Corresponding to the above method embodiments, an apparatus for blockchain-based asset issuance is also provided according to some embodiments of the present disclosure. Embodiments of the apparatus for the blockchain-based asset issuance of the present disclosure may be applied to an electronic device. The embodiments of the apparatus may be implemented by software, or may be implemented by hardware or a combination of hardware and software. Taking the software implementation as an example, the apparatus, as a logical apparatus, is located on an electronic device and is formed by a processor of the electronic device in which the corresponding computer program instructions in the non-volatile memory are read into a memory for run. From a hardware level, as shown in FIG. 2, a hardware structure diagram of an electronic device in which the apparatus for blockchain-based asset issuance according to the present disclosure is located. In addition to a processor 210, a memory 220, a network interface 230 and a non-volatile storage 240 shown in FIG. 2, the electronic device in which the apparatus in the embodiments is located may include other hardware according to actual function of the electronic device, which are not described in details herein.

Figure 3:
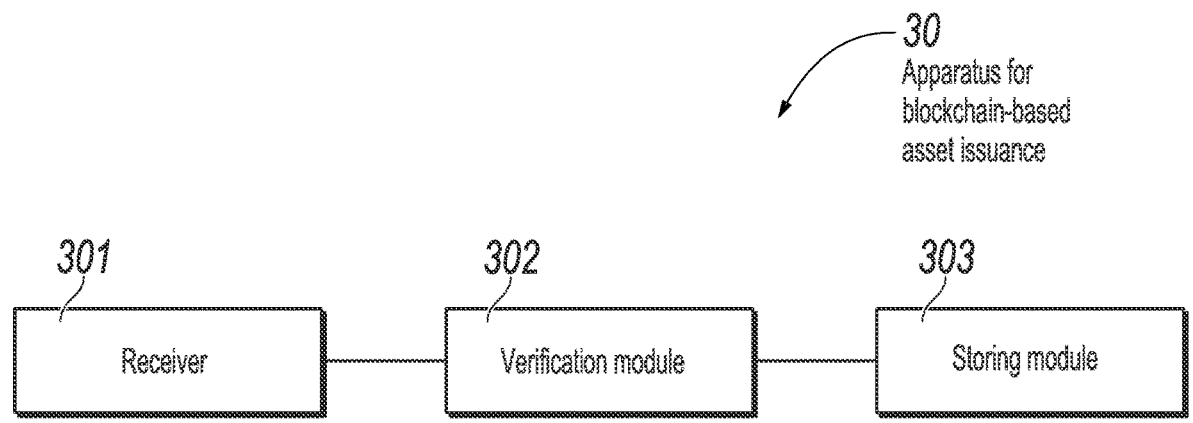
FIG. 3 is a block diagram of an apparatus for blockchain-based asset issuance according to an exemplary embodiment.

FIG. 3 is a block diagram of an apparatus for blockchain-based asset issuance according to an exemplary embodiment.

Referring to FIG. 3, the apparatus for blockchain-based asset issuance 30 may be applied to the electronic device shown in FIG. 3. The apparatus 30 includes a receiver 301, a verification module 302, and a storing module 303.

The receiver 301 is configured to receive an asset issuance transaction sent by an asset issuer. The asset issuance transaction includes a commitment value and a proof for performing Zero-knowledge Proof with respect to the commitment value, and the commitment value is calculated by inputting at least an asset type of a target asset object issued by the asset issuer as input data to a commitment function.

The verification module 302 is configured to initiate the Zero-knowledge Proof with respect to the commitment value based on the proof, so to verify whether the asset type of the target asset object is a legal asset type allowed to be issued by the asset issuer.

The storing module 303 is configured to, if a verification result output by the verification module 302 is YES, issue the commitment value to the blockchain for storage.

In an embodiment of the present disclosure, the proof is generated by calculating via a proof generation algorithm implemented in the blockchain with inputting, by the asset issuer, at least the commitment value and legal asset type(s) allowed to be issued by the asset issuer as input data.

In an embodiment of the present disclosure, the node device maintains a verification rule for verifying whether the asset type of the target asset object is a legal asset type allowed to be issued by the asset issuer.

In this case, the proof is generated by calculating via a proof generation algorithm implemented in the blockchain with inputting, by the asset issuer, at least the verification data related to the verification rule as input data.

In an embodiment of the present disclosure, if the blockchain supports hiding identity information of the asset issuer, the input data to the proof generation algorithm further includes a private key of the asset issuer.

In an embodiment of the present disclosure, the verification module 302 is configured to: if the blockchain does not support hiding identity information of the asset issuer, initiate the Zero-knowledge Proof with respect to the commitment value based on the proof, so to verify whether the asset type of the target asset object is a legal asset type allowed to be issued by the asset issuer; if the blockchain supports hiding identity information of the asset issuer, initiate the Zero-knowledge Proof with respect to the commitment value based on the proof, so to verify whether the asset issuer holds a private key corresponding to a public key of legal asset issuer, and whether the asset type of the target asset object is a legal asset type allowed to be issued by the legal asset issuer.

In an embodiment of the present disclosure, the verification module 302 is configured to: calculating with a proof verification algorithm by inputting at least the proof and the commitment value as input data to the proof verification algorithm; and determine whether the asset type of the target asset object is the legal asset type allowed to be issued by the asset issuer based on an output result from the proof verification algorithm.

In an embodiment of the present disclosure, if the node device is configured with a verification rule for verifying whether the asset type of the target asset object is a legal asset type allowed to be issued by the asset issuer, the input data may also include verification data related to the verification rule.

In an example of the present disclosure, the node device maintains an asset type list constructed based on legal asset types allowed to be issued by the asset issuer.

In this case, the verification rule may include: verifying whether an asset type of the target asset object is included in the asset type list or not; and if the verification result is YES, determining that the asset type of the target asset object is the legal asset type allowed to be issued by the asset issuer.

The verification data includes the asset type list.

In an example of the present disclosure, the node device maintains a hash tree constructed based on respective hash values of legal asset types allowed to be issued by the asset issuer.

In this case, the verification rule may include: verifying whether a hash value of the asset type of the target asset object is included in the hash tree or not; and if verification result is YES, determining that the asset type of the target asset object is the legal asset type allowed to be issued by the asset issuer.

The verification data includes the hash tree.

In an example, the node device maintains a public key list or a hash tree, where the public key list is constructed based on public keys of all of legal asset issuers, and the hash tree comprises respective hash values of the public keys of all of legal asset issuers.

In this case, the verification rule may include: verifying whether a prefix or suffix for the asset type of the target asset object matches any one of follows: a public key of legal asset issuer, the prefix or suffix for the public key of legal asset issuer, a hash value of the public key of legal asset issuer, and the prefix or suffix for the hash value of the public key of legal asset issuer; and if the verification result is YES, determining that the asset type of the target asset type is the legal asset type allowed to be issued by the asset issuer.

The verification data includes the public key list or the hash tree.

In embodiments of the present disclosure, the commitment function may be a hash function, and the zero-knowledge proof algorithm implemented in the blockchain is a zksnark algorithm or a zkstark algorithm.

Details of the implementation process of functions and action of the modules in the foregoing apparatus refer to the implementation process of the corresponding steps in the foregoing methods, which are not described in details herein.

For the embodiments of the apparatus, since they basically correspond to the embodiments of the method, they may be referred to the partial description of the embodiments of the method. The embodiments of the apparatus are merely illustrative, where units described as separate components may or may not be physically separated, and components displayed as units may or may not be physical units, i.e., may be located a same location, or it may be distributed to multiple network units. Some or all of the modules may be selected according to actual demands to achieve the objectives of the present disclosure. Those of ordinary skill in the art may understand and achieve without any creative effort.

A system, an apparatus, a module or a unit in the embodiments may be implemented by a computer chip or an entity, or by a product having a certain function. A typical implementation device is a computer, and the specific form of the computer may be a personal computer, a laptop computer, a cellular phone, a camera phone, an intelligent phone, a personal digital assistant, a media player, a navigation device, an email transceiver, a game console, a tablet, a wearable device, or a combination of any number of these devices.

Corresponding to the embodiments of the method, an electronic device is also provided according to some embodiments of the present disclosure. The electronic device includes a processor and a storage for storing machine-executable instructions. The processor and the storage are typically interconnected by an internal bus. In other possible implementations, the device may also include an external interface to enable communication with other devices or components.

In embodiments of the present disclosure, by reading and executing the machine-executable instructions stored in the storage corresponding to control logic of blockchain-based asset issuance, the processor is caused to: receive an asset issuance transaction sent by the asset issuer, where the asset issuance transaction includes a commitment value and a proof for performing Zero-knowledge Proof with respect to the commitment value, the commitment is calculated by inputting at least an asset type of a target asset object issued by the asset issuer as input data to a commitment function; initiate the Zero-knowledge Proof with respect to the commitment value based on the proof, so to verify whether the asset type of the target asset object is a legal asset type allowed to be issued by the asset issuer; and if the verification result is YES, issue the commitment value to the blockchain for storage.

In embodiments of the present disclosure, by reading and executing the machine-executable instructions stored in the storage corresponding to the control logic of the blockchain-based asset issuance, the processor is caused to: if the blockchain does not support hiding the identity information of the asset issuer, initiate the Zero-knowledge Proof with respect to the commitment value based on the proof, so to verify whether the asset type of the target asset object is a legal asset type allowed to be issued by the asset issuer; if the blockchain supports hiding the identity information of the asset issuer, initiate the Zero-knowledge Proof with respect to the commitment value based on the proof, so to verify whether the asset issuer holds a private key corresponding to a public key of legal asset issuer, and whether the asset type of the target asset object is a legal asset type allowed to be issued by the legal asset issuer.

In these embodiments, by reading and executing the machine-executable instructions stored in the storage corresponding to the control logic of the blockchain-based asset issuance, the processor is caused to: calculate with a proof verification algorithm by inputting at least the proof and the commitment value as input data to the proof verification algorithm; and determine whether the asset type of the target asset object is a legal asset type allowed to be issued by the asset issuer based on an output result from the proof verification algorithm.

Other embodiments of the present disclosure will be readily apparent for those skilled in the art. The description is intended to cover any variations, uses, or adaptations of the present disclosure, which are in accordance with the general principles of the disclosure and include common general knowledge or common technical means in the art that are not disclosed in this disclosure. The embodiments in the disclosure are regarded as to be exemplary only, and the true scope and spirit of the disclosure is indicated by the appended claims.

It is to be understood that the invention is not limited to the precise structure described and shown in the attached drawings, and may be modified and altered without departing from the scope of the invention. The scope of this disclosure is limited only by the accompanying claims.

The above description is only the preferred embodiment of the present disclosure, and is not intended to limit the disclosure. Any modifications, equivalent substitutions, improvements, etc. within the spirit and principles of the present disclosure, should be included in the present disclosure.

What is claimed is:

1. A computer-implemented method for blockchain-based asset issuance, the computer-implemented method comprising:
   maintaining, by a node device in a blockchain, verification data corresponding to a set of legal asset types allowed to be issued by an asset issuer, wherein the node device is configured with a verification rule for determining whether an asset type of a target asset object issued by the asset issuer is in the set of legal asset types allowed to be issued by the asset issuer, and wherein the verification data is related to the verification rule;
   receiving, by the node device in the blockchain and from the asset issuer, a request to generate an output of a proof generation algorithm, wherein the proof generation algorithm is implemented in the blockchain;
   generating, by the node device, the output of the proof generation algorithm by supplying the proof generation algorithm with input data provided by the asset issuer, wherein the input data comprises the verification data, a commitment value and the set of legal asset types allowed to be issued by the asset issuer, and wherein the commitment value is calculated, by the asset issuer, by supplying at least the asset type of the target asset object issued by the asset issuer to a commitment function;

transmitting, by the node device, the output of the proof generation algorithm to the asset issuer for calculation of a proof of the commitment value by the asset issuer;

receiving, by the node device, an asset issuance transaction, wherein the asset issuance transaction comprises the commitment value and the proof for performing a zero-knowledge proof with respect to the commitment value;

initiating, by the node device, a process of verifying the proof based on the verification rule, wherein the process of verifying the proof is used for the zero-knowledge proof with respect to the commitment value;

verifying, by the node device, the proof based on the verification rule, by determining that the asset type of the target asset object is in the set of legal asset types allowed to be issued by the asset issuer, comprising:
determining that asset type related data of the target asset object is included in the verification data; and
in response to determining that the asset type related data of the target asset object is included in the verification data, determining that the asset type of the target asset object is in the set of legal asset types allowed to be issued by the asset issuer; and in response to determining that the asset type of the target asset object is in the set of legal asset types allowed to be issued by the asset issuer, issuing, by the node device, the commitment value to the blockchain for storage, wherein the asset type of the target asset object issued by the asset issuer is hidden in the blockchain.

2. The computer-implemented method of claim 1, further comprising:
determining that the blockchain supports hiding identity information of the asset issuer; and
in response to determining that the blockchain supports hiding the identity information of the asset issuer, the input data to the proof generation algorithm further comprises a private key of the asset issuer.

3. The computer-implemented method of claim 2, wherein determining that the asset type of the target asset object is a legal asset type allowed to be issued by the asset issuer further comprises:
determining that the private key of the asset issuer corresponds to a public key of a legal asset issuer.

4. The computer-implemented method of claim 1, wherein:
the asset type related data of the target asset object comprises the asset type of the target asset object; and
the verification data comprises an asset type list comprising the set of legal asset types allowed to be issued by the asset issuer.

5. The computer-implemented method of claim 1, wherein:
the asset type related data of the target asset object comprises a hash value of the asset type of the target asset object; and
the verification data comprises a hash tree comprising hash values of the set of legal asset types allowed to be issued by the asset issuer.

6. The computer-implemented method of claim 1, wherein:
the asset type related data of the target asset object comprises a prefix or a suffix of the asset type of the target asset object; and the verification data comprises a public key list comprising public keys of all of legal asset issuers or a hash tree comprising hash values of the public keys of all of legal asset issuers.

7. The computer-implemented method of claim 1, further comprising:
determining, by the node device, that the asset type of the target asset object is not in the set of legal asset types allowed to be issued by the asset issuer; and
discarding, by the node device, the asset issuance transaction.

8. A non-transitory, computer-readable medium storing one or more instructions executable by a computer system to perform operations comprising:
maintaining, by a node device in a blockchain, verification data corresponding to a set of legal asset types allowed to be issued by an asset issuer, wherein the node device is configured with a verification rule for determining whether an asset type of a target asset object issued by the asset issuer is in the set of legal asset types allowed to be issued by the asset issuer, and wherein the verification data is related to the verification rule;

receiving, by the node device in the blockchain and from the asset issuer, a request to generate an output of a proof generation algorithm, wherein the proof generation algorithm is implemented in the blockchain;

generating, by the node device, the output of the proof generation algorithm by supplying the proof generation algorithm with input data provided by the asset issuer, wherein the input data comprises the verification data, a commitment value and the set of legal asset types allowed to be issued by the asset issuer, and wherein the commitment value is calculated, by the asset issuer, by supplying at least the asset type of the target asset object issued by the asset issuer to a commitment function;

transmitting, by the node device, the output of the proof generation algorithm to the asset issuer for calculation of a proof of the commitment value by the asset issuer;

receiving, by the node device, an asset issuance transaction, wherein the asset issuance transaction comprises the commitment value and the proof for performing a zero-knowledge proof with respect to the commitment value;

initiating, by the node device, a process of verifying the proof based on the verification rule, wherein the process of verifying the proof is used for the zero-knowledge proof with respect to the commitment value;

verifying, by the node device, the proof based on the verification rule, by determining that the asset type of the target asset object is in the set of legal asset types allowed to be issued by the asset issuer, comprising:
determining that asset type related data of the target asset object is included in the verification data; and
in response to determining that the asset type related data of the target asset object is included in the verification data, determining that the asset type of the target asset object is in the set of legal asset types allowed to be issued by the asset issuer; and in response to determining that the asset type of the target asset object is in the set of legal asset types allowed to be issued by the asset issuer, issuing, by the node device, the commitment value to the blockchain for storage, wherein the asset type of the target asset object issued by the asset issuer is hidden in the blockchain.

9. The non-transitory, computer-readable medium of claim 8, further comprising:
  determining that the blockchain supports hiding identity information of the asset issuer; and
  in response to determining that the blockchain supports hiding the identity information of the asset issuer, the input data to the proof generation algorithm further comprises a private key of the asset issuer.

10. The non-transitory, computer-readable medium of claim 9, wherein determining that the asset type of the target asset object is a legal asset type allowed to be issued by the asset issuer further comprises:
  determining that the private key of the asset issuer corresponds to a public key of a legal asset issuer.

11. The non-transitory, computer-readable medium of claim 8, wherein:
  the asset type related data of the target asset object comprises the asset type of the target asset object; and
  the verification data comprises an asset type list comprising the set of legal asset types allowed to be issued by the asset issuer.

12. The non-transitory, computer-readable medium of claim 8, wherein:
  the asset type related data of the target asset object comprises a hash value of the asset type of the target asset object; and
  the verification data comprises a hash tree comprising hash values of the set of legal asset types allowed to be issued by the asset issuer.

13. The non-transitory, computer-readable medium of claim 8, wherein:
  the asset type related data of the target asset object comprises a prefix or a suffix of the asset type of the target asset object; and
  the verification data comprises a public key list comprising public keys of all of legal asset issuers or a hash tree comprising hash values of the public keys of all of legal asset issuers.

14. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    maintaining, by a node device in a blockchain, verification data corresponding to a set of legal asset types allowed to be issued by an asset issuer, wherein the node device is configured with a verification rule for determining whether an asset type of a target asset object issued by the asset issuer is in the set of legal asset types allowed to be issued by the asset issuer, and wherein the verification data is related to the verification rule;
    receiving, by the node device in the blockchain and from the asset issuer, a request to generate an output of a proof generation algorithm, wherein the proof generation algorithm is implemented in the blockchain;
    generating, by the node device, the output of the proof generation algorithm by supplying the proof generation algorithm with input data provided by the asset issuer, wherein the input data comprises the verification data, a commitment value and the set of legal asset types allowed to be issued by the asset issuer, and wherein the commitment value is calculated, by the asset issuer, by supplying at least the asset type of the target asset object issued by the asset issuer to a commitment function;
    transmitting, by the node device, the output of the proof generation algorithm to the asset issuer for calculation of a proof of the commitment value by the asset issuer;
    receiving, by the node device, an asset issuance transaction, wherein the asset issuance transaction comprises the commitment value and the proof for performing a zero-knowledge proof with respect to the commitment value;
    initiating, by the node device, a process of verifying the proof based on the verification rule, wherein the process of verifying the proof is used for the zero-knowledge proof with respect to the commitment value;
    verifying, by the node device, the proof based on the verification rule, by determining that the asset type of the target asset object is in the set of legal asset types allowed to be issued by the asset issuer, comprising:
      determining that asset type related data of the target asset object is included in the verification data; and
      in response to determining that the asset type related data of the target asset object is included in the verification data, determining that the asset type of the target asset object is in the set of legal asset types allowed to be issued by the asset issuer; and
    in response to determining that the asset type of the target asset object is in the set of legal asset types allowed to be issued by the asset issuer, issuing, by the node device, the commitment value to the blockchain for storage, wherein the asset type of the target asset object issued by the asset issuer is hidden in the blockchain.

15. The computer-implemented system of claim 14, further comprising:
  determining that the blockchain supports hiding identity information of the asset issuer; and
  in response to determining that the blockchain supports hiding the identity information of the asset issuer, the input data to the proof generation algorithm further comprises a private key of the asset issuer.

16. The computer-implemented system of claim 15, wherein determining that the asset type of the target asset object is a legal asset type allowed to be issued by the asset issuer further comprises:
  determining that the private key of the asset issuer corresponds to a public key of a legal asset issuer.

17. The computer-implemented system of claim 14, wherein:
  the asset type related data of the target asset object comprises the asset type of the target asset object; and
  the verification data comprises an asset type list comprising the set of legal asset types allowed to be issued by the asset issuer.

18. The computer-implemented system of claim 14, wherein:
  the asset type related data of the target asset object comprises a hash value of the asset type of the target asset object; and
  the verification data comprises a hash tree comprising hash values of the set of legal asset types allowed to be issued by the asset issuer.

19. The computer-implemented system of claim 14, wherein:
- the asset type related data of the target asset object comprises a prefix or a suffix of the asset type of the target asset object; and
- the verification data comprises a public key list comprising public keys of all of legal asset issuers or a hash tree comprising hash values of the public keys of all of legal asset issuers.

* * * * *